May 17, 1927.

T. N. DRUMMOND 1,629,207

RING INSERTER FOR MILKING MACHINE TEAT CUP INFLATIONS

Filed Oct. 22, 1926

Inventor
T. N. Drummond
by Langner, Parry, Card & Langner
Att'ys.

Patented May 17, 1927.

1,629,207

UNITED STATES PATENT OFFICE.

THOMAS NEILSON DRUMMOND, OF HAMILTON, NEW ZEALAND, ASSIGNOR OF ONE-HALF TO LESLIE BEAUCHAMP MAUNSELL, OF ERIDGE, MASTERTON, NEW ZEALAND.

RING INSERTER FOR MILKING-MACHINE TEAT-CUP INFLATIONS.

Application filed October 22, 1926, Serial No. 143,458, and in New Zealand June 21, 1926.

This invention relates to devices used for inserting rings in the inflations of milking machine teat cups and provides for the aforesaid purpose an improved form of device of the type comprising a cone formation of fingers, onto which an end of an inflation is fitted, and a ring carrying member adapted to be forced through said cone formation from the base thereof, in order to insert the ring within the inflation.

The improved device provided by this invention comprises a disc with fingers pivotally attached to the edge thereof, so that the outer ends of said fingers can contact with each other, a ring carrying disc located between said first mentioned disc and the pivoted fingers being adapted to be forced between the latter, to expand them and the end of an inflation placed thereon and so as to force the ring into the inflation.

The ring carrying disc has bevelled edge portions for contacting with the fingers, said bevelled portions being separated by projections on which the ring rests, also the disc to which the fingers are attached has a boss and handle through which the stem to which the ring carrying disc is secured, slides, said stem being provided with a push handle.

The fingers are preferably curved through their length over the discs and have approximately straight portions at their ends.

The invention will be further described in conjunction with the accompanying drawing wherein:—

Figures 1, 2, 3:
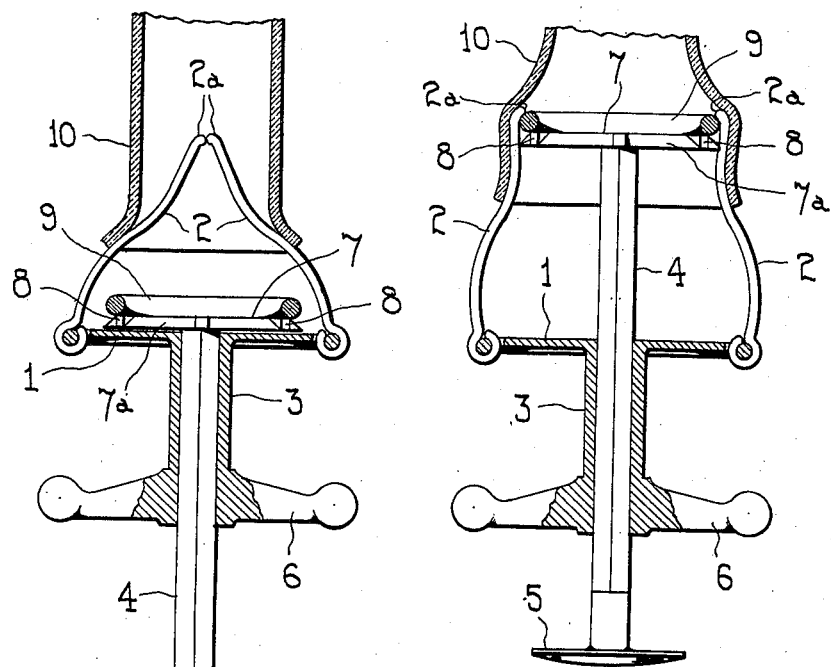
Figure 1 is a sectional elevation of the improved device, showing an inflation placed thereon and a ring in position to be inserted in said inflation.
Figure 2 is a similar view to Figure 1 showing the fingers and the inflation expanded by the ring carrying disc, and the ring just about to be inserted in the inflation.
Figure 3 is a plan view of the device prior to being used.

A disc 1 has pivotally attached thereto at or near its periphery, a number of equally spaced fingers 2, the latter being adapted to contact with each other, at their outer ends over the disc 1 and being curved through their length over the latter and also having approximately straight portions 2ª at or near their outer ends.

The disc 1 has formed thereon a boss 3 through which a stem 4 is slidable, the latter preferably being flat sided and fitting a correspondingly formed bore in the aforesaid boss.

One end of the stem 4 is fitted with a push handle 5, and the boss 3 with a cross piece or handle 6, while the other end of said stem carries a smaller disc 7 with downwardly and outwardly bevelled edge portions 7ª between which are a number of projections 8 having vertical outer surfaces and horizontal upper surfaces, said disc 7 being surrounded by the aforesaid pivoted fingers 2, and being capable of being slid by the stem 4 to open out said fingers.

At their outer ends the fingers 2 are slightly inturned.

To use the device the ring 9 to be inserted in an inflation 10 is placed on the projections 8 of the disc 7 carried by the stem 4, said disc being positioned at the pivoted or inner ends of the fingers 2, which are then arranged so that their outer ends contact with each other, and provide an approximate skeleton cone formation, on to which is forced the end of the inflation 10, wherein the ring is to be inserted.

The operator then grips with his fingers, the cross piece or handle 6 affixed to the aforesaid boss 3, and applies pressure to the push handle 5 on the stem 4 by the palm of the same hand, which action results in the disc 7 carrying the ring 9 being forced between the pivoted fingers 2 to open same out, and expand the end of the inflation 10 placed thereon. Continued movement of the disc 7 carrying the ring 9 from the disc 1 with the fingers 2 attached results in the ring being forced past the ends of the pivoted and now opened fingers 2 into the expanded inflation 10, after which said pivoted fingers can be withdrawn from the inflation, by moving the disc 7 so as to allow said fingers to collapse, leaving the ring 9 in the expanded end of the inflation 10.

What I do claim and desire to obtain by Letters Patent of the United States of America, is:—

1. A ring inserter for milking machine teat cup inflations, comprising a disc; fingers pivotally attached to the edge of the latter so that their outer ends can contact with each other; a ring carrying disc located between said pivoted fingers and said first mentioned disc, and a stem slidable through the first mentioned disc, to which said ring-carrying disc is secured.

2. A ring inserter for milking machine teat cup inflations, according to claim 1, and wherein the pivoted fingers are equally spaced around the disc to which they are pivoted and are curved throughout a portion of their length to form camming surfaces with which said ring-carrying disc coacts for expanding said fingers.

3. A ring inserter for milking machine teat cup inflations, according to claim 1, wherein the pivoted fingers are curved throughout a portion of their length to form camming surfaces with which said ring-carrying disc coacts for expanding said fingers, and have approximately straight portions at their outer ends.

4. A ring inserter for milking machine teat cup inflations, according to claim 1, and wherein the ring carrying disc has bevelled edge portions, which contact with the pivoted fingers.

5. A ring inserter for milking machine teat cup inflations, according to claim 1, wherein the ring carrying disc has bevelled edge portions which contact with the pivoted fingers, said bevelled portions being separated by projections on which the ring rests.

6. A ring inserter for milking machine teat cup inflations, according to claim 1, and wherein the disc to which the fingers are pivoted, is provided with a boss and cross handle through which the stem slides, the latter being fitted with a push handle.

In testimony whereof I have signed my name to this specification.

THOMAS NEILSON DRUMMOND.